United States Patent
Agarwal et al.

(10) Patent No.: US 8,749,211 B2
(45) Date of Patent: Jun. 10, 2014

(54) HIGH VOLTAGE POWER SUPPLY HAVING A SOFT-START CIRCUIT

(75) Inventors: Pankaj Agarwal, Suwon-si (KR); Joon-hyun Yang, Suwon-si (KR); Sung-jin Choi, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 867 days.

(21) Appl. No.: 12/951,326

(22) Filed: Nov. 22, 2010

(65) Prior Publication Data
US 2011/0234186 A1  Sep. 29, 2011

(30) Foreign Application Priority Data
Mar. 23, 2010  (KR) .................. 10-2010-0025854

(51) Int. Cl.
*H02J 3/12* (2006.01)
*H02J 3/14* (2006.01)
*H02J 3/16* (2006.01)

(52) U.S. Cl.
USPC ............ 323/238; 323/246; 323/284; 323/288

(58) Field of Classification Search
USPC ......... 323/238, 242–243, 246, 266, 275–278, 323/281–282, 284–286, 288–289, 321, 323, 323/326, 327, 350; 363/49
See application file for complete search history.

(56) References Cited

U.S. PATENT DOCUMENTS

| | | | | |
|---|---|---|---|---|
| 6,552,517 B1* | 4/2003 | Ribellino et al. | ............. | 323/282 |
| 7,106,036 B1* | 9/2006 | Collins | ................. | 323/282 |
| 7,576,522 B2* | 8/2009 | Chen et al. | .................... | 323/271 |
| 7,579,817 B2* | 8/2009 | Agari et al. | .................... | 323/282 |
| 7,619,397 B2* | 11/2009 | Al-Shyoukh | ................. | 323/281 |
| 7,626,371 B2* | 12/2009 | Hoshino et al. | ............... | 323/283 |
| 7,688,009 B2* | 3/2010 | Bayadroun | .................. | 315/360 |
| 7,868,602 B2* | 1/2011 | Omi et al. | ..................... | 323/284 |
| 2008/0094048 A1* | 4/2008 | Basso et al. | .................. | 323/283 |
| 2011/0101949 A1* | 5/2011 | Lopata et al. | ................. | 323/286 |

* cited by examiner

*Primary Examiner* — Adolf Berhane
*Assistant Examiner* — Nusrat Quddus
(74) *Attorney, Agent, or Firm* — Sughrue Mion, PLLC

(57) ABSTRACT

A high voltage power supply is provided. The high voltage power supply includes a soft-start circuit unit which outputs a natural voltage that decreases exponentially as time elapses and converts the natural voltage into a forced voltage having a predetermined scale if an enable signal is applied, a controller which compares the natural voltage output from the soft-start circuit unit with a reference voltage and outputs a control signal, and a converting unit which delays outputting a final voltage during a first predetermined time period and outputs the final voltage, which gradually increases as time elapses according to the control signal.

18 Claims, 9 Drawing Sheets

HIGH VOLTAGE POWER SUPPLY HAVING A SOFT-START CIRCUIT

CROSS-REFERENCE TO RELATED APPLICATION

This application claims priority from Korean Patent Application No. 2010-25854, filed in the Korean Intellectual Property Office on Mar. 23, 2010, the disclosure of which is incorporated herein by reference.

BACKGROUND

1. Field

Aspects of the exemplary embodiments relate to a high voltage power supply, and more particularly, to a high voltage power supply which soft-starts when a high voltage is applied.

2. Description of the Related Art

With the development of electronic technology, various power supplies have emerged.

The power supply is a device which supplies power to an external circuit (or a load), and it may damage the external circuit if the power supplied to the external circuit changes drastically for a short a period of time.

The above problem may become more serious if the power supply provides a high voltage, ranging from several kilovolts to tens of kilovolts. For example, driving a Carbon Nano Tube (CNT) backlight of an LCD TV requires tens of kilovolts. Accordingly, in order not to damage the CNT backlight, the power supply needs to have a soft-start circuit.

In the related art, a soft-start circuit is realized by recharging a capacitor, but this method is not appropriate in a high voltage power supply. Therefore, a soft-start circuit which can be used in a high voltage power supply is required.

SUMMARY

Aspects of the exemplary embodiments relate to a high voltage power supply which may soft-start when a high voltage is applied.

A high voltage power supply, according to an exemplary embodiment, includes a soft-start circuit unit which outputs a natural voltage that decreases exponentially as time elapses and converts the natural voltage into a forced voltage having a predetermined scale if an enable signal is applied, a controller which compares the output voltage with a reference voltage and outputs a control signal, and a converting unit which delays outputting a final voltage during a predetermined time period and outputs a final voltage that gradually increases as time elapses according to the control signal.

The controller may output a control signal whose value is "0" if the voltage output from the soft-start circuit unit exceeds the reference voltage, and output a control signal whose duty ratio gradually increases as the output voltage becomes lower than the reference voltage.

The soft-start circuit unit may include a driving unit which applies a driving voltage according to the enable signal, a charging and discharging unit which charges or discharges an energy storing element if the driving voltage is applied, and a voltage divider which outputs distributed voltage according to charging or discharging operation.

The driving unit may include a transistor, and the enable signal may be applied through a driving resistor connected directly to a first terminal of the transistor, the driving voltage may be applied in a second terminal of the transistor, one node of the charging and discharging unit may be connected to a third terminal of the transistor, and the driving voltage may be applied to the third terminal according to permission of the enable signal.

In the charging and discharging unit, one end of a capacitor may be connected to the third terminal of the transistor, the other end of the capacitor may be connected to a first node, one end of the first node may be connected to the other end of a charging resistor in which one end is connected to a ground, and one end of the capacitor may be connected to the other end of a discharging resistor in which one end is connected to a ground.

The voltage divider may include a second node, and the second node may be connected to one end of a first resistor, the other end of the first resistor may be connected to an output terminal of the converting unit, the second node may be connected to the other end of a second resistor, one end of the second resistor may be connected to the ground, the second node may be connected to a cathode of a diode, an anode of the diode may be connected to the other end of a third resistor, one end of the third resistor may be connected to the other end of the capacitor and the other end of the charging resistor, and the second node may be connected to one end of the controller.

The diode may cut off electric current flowing from the second node to the first node.

A slew rate of the final voltage may be in inverse proportion to the product of the capacitance of the capacitor and the charging resistor.

A voltage of an output terminal of the converting unit may be calculated based on following equation:

$$V_{out}(t) = \begin{cases} 0, & \text{if } 2Vref \le e^{-\frac{t}{Rd \cdot Cd}} Ve \\ \frac{Rg}{Rs}\left(2Vref - e^{-\frac{t}{Rd \cdot Cd}} Ve\right), & \text{if } 2Vref > e^{-\frac{t}{Rd \cdot Cd}} Ve \end{cases}$$

In the equation, Vout represents a voltage of an output terminal of a converting unit, Vref represents a reference voltage, Rd represents a charging resistor, Cd represents capacitance, Ve represents a driving voltage, Rg represents a first resistor, Rs represents a second resistor, and Rx represents a third resistor.

The predetermined time $T_A$ may be calculated based on following equation:

$$T_A = Rd \cdot Cd \cdot \ln\left(\frac{Ve}{2Vref}\right)$$

Time $T_B$ from when the final voltage is output for the first time to when the final voltage is saturated may be calculated based on following equation:

$$T_B = Rd \cdot Cd \cdot \ln\left(\frac{2Vref}{Vref + Vdiode}\right)$$

In the equation, Vdiode represents voltage of a diode.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION OF THE EXEMPLARY EMBODIMENTS

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
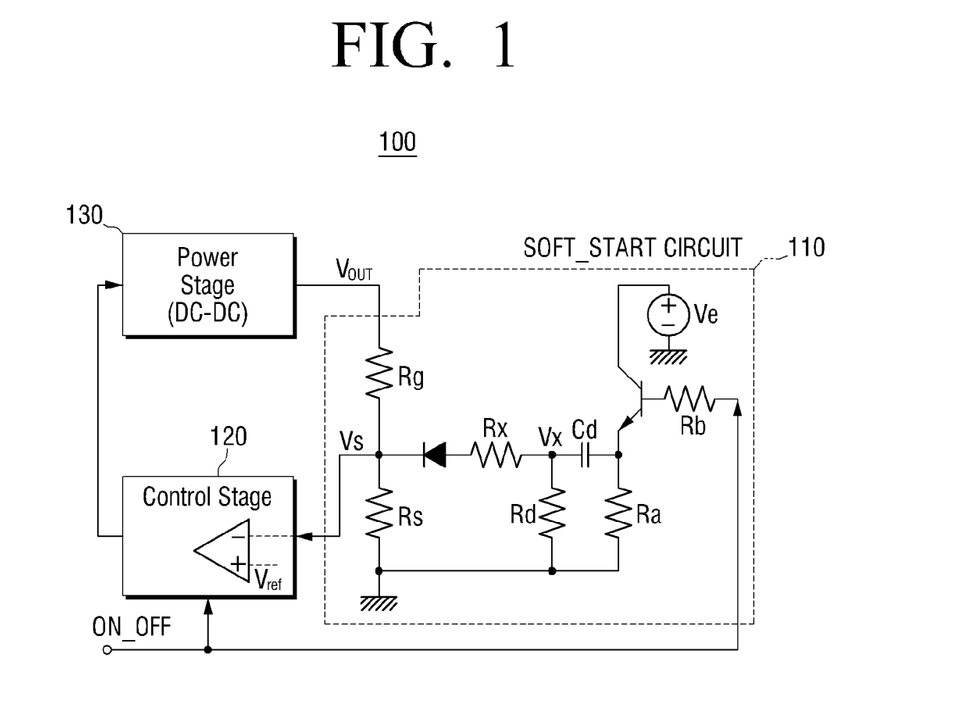
FIG. 1 is a high voltage power supply according to an exemplary embodiment.

FIG. 1 is a high voltage power supply according to an exemplary embodiment. Referring to FIG. 1, the high voltage power supply 100 comprises a soft-start circuit unit 110, a controller 120, and a converting unit 130.

If an enable signal is applied, the soft-start unit 110 outputs a natural voltage which decreases exponentially as time elapses and converts the natural voltage into a forced voltage having a predetermined scale.

The enable signal is a signal that drives the soft-start circuit unit 110. Examples of the enable signal may include a 5V direct voltage. In addition, the enable signal may be a signal that drives the controller 120 which will be explained later.

The natural voltage may be a voltage which decreases exponentially as time goes by, and the forced voltage may be a voltage which has a constant value regardless of passage of time.

The controller 120 compares a voltage output from the soft-start circuit unit 110 with a reference voltage and outputs a control signal.

Specifically, if the voltage output from the soft-start circuit unit 110 is higher than the reference voltage (Vref), the controller 120 outputs a control signal of "0". Althernatively, if the voltage output from the soft-start circuit unit 110 is lower than the reference voltage (Vref), the controller 120 outputs a control signal having a predetermined value. That is, the controller 120 may output a control signal whose duty ratio gradually increases as the voltage output from the soft-start circuit unit 110 gets lower than the reference voltage (Vref).

The converting unit 130 delays the output of a final voltage for a predetermined time period according to a control signal output from the controller 120, and outputs the final voltage which increases as time goes by. The converting unit 130 may include a DC-DC converter.

The predetermined time period and the time from when the final voltage is output for the first time to when the final voltage is saturated may be adjusted according to the value of an element included in the soft-start circuit unit 110 and the reference voltage (Vref).

Accordingly, the present high voltage power supply 100 which has a relatively simple configuration may perform a soft-start in high voltage while saving costs.

The present high voltage power supply 100 may be applied to various devices in various fields such as a television and an image forming apparatus. The present high voltage power supply 100 may also be used to drive a CNT backlight of an LCD TV.

FIG. 1 illustrates the soft-start circuit unit 110 which includes a first resistor (Rg) and a second resistor (Rs), but the soft-start circuit unit 110 may include other components than the first resistor (Rg) and the second resistor (Rs).

Figure 2:
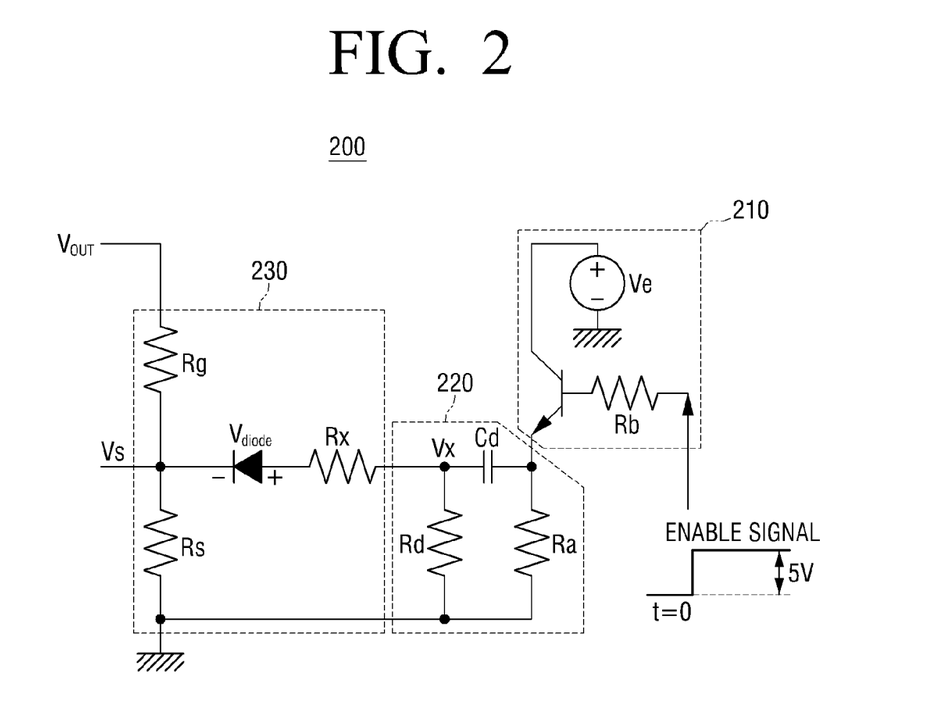
FIG. 2 is a detailed view of the soft-start circuit unit in FIG. 1.

FIG. 2 is a detailed view of the soft-start circuit unit in FIG. 1. Referring to FIG. 2, the soft start circuit 200 comprises a driving unit 210, a charging and discharging unit 220, and a voltage divider 230.

The driving unit 210 may apply a driving voltage according to an enable signal. Specifically, the driving unit 210 may comprise a transistor (T), a driving power (Ve), and a driving resistor (Rb).

For example, the transistor (T) may be an NPN-type transistor. In this exemplary embodiment below, the transistor (T) is assumed to be an NPN-type transistor. However, the transistor may be a PNP-type transistor or an MOS-type transistor.

The driving power (Ve) may be a direct voltage source.

The driving resistor (Rb) may be a base resistor of the transistor (T) and performs a function for protecting the transistor (T) as an external signal (an enable signal) is applied.

The base of the transistor (T) (that is, a first terminal) may be connected to one end of the driving resistor (Rb), the collector of the transistor (T) (that is, a second terminal) may be connected to the driving power (Ve), and an emitter of the transistor (T) (that is, a third terminal) may be connected to one node of the charging and discharging unit 220 which will be explained later (that is, a node between a capacitor (Cd) and a discharging resistor (Ra)).

Once a driving voltage is applied, the charging and discharging unit 220 may charge or discharge an energy storing element. The energy storing element may be realized as at least one capacitor. Specifically, the charging and discharging unit 220 may include a charging resistor (Rd), a capacitor (Cd), and a discharging resistor (Ra).

The charging resistor (Rd), the capacitor (Cd), and the discharging resistor (Ra) of the charging and discharging unit 220 constitute a closed loop, and the charging and the discharging unit 220 may operate as a sort of a high-pass filter (HPF) when the voltage of the charging resistor (Rd) is measured. Here, the node between the charging resistor (Rd) and the capacitor (Cd) may be the first node.

One end of the capacitor (Cd) is connected to the emitter of the transistor (T) and the other end of the capacitor is connected to the first node (that is, the other end of the charging resistor (Rd)).

One end of the charging resistor (Rd) is connected to the ground, and the other end of the charging resistor (Rd) is connected to the first node (that is, the other end of the capacitor (Cd)).

One end of the discharging resistor (Ra) is connected to the ground, and the other end of the discharging resistor (Ra) is connected to one end of the capacitor (Cd).

The voltage divider 230 may output a distributed voltage according to charging or discharging the voltage. Specifically, the voltage divider 230 includes the first resistor (Rg), the second resistor (Rs), the third resistor (Rx), and a diode.

One end of the first resistor (Rg) is connected to the second node, and the other end of the first resistor (Rg) is connected to the output terminal of the converting unit 130.

One end of the second resistor (Rs) is connected to the ground, and the other end of the second resistor (Rs) is connected to the second node.

The cathode of the diode is connected to the second node, and the anode of the diode is connected to the other end of the third resistor (Rx). Here, the diode may be realized as a diode in various types and prevents an electric current from flowing in the direction of the first node.

One end of the third resistor (Rx) is connected to the first node, and the other end of the third resistor (Rx) is connected to the anode of the diode.

In addition, the second node is connected to one end of the controller 120 (that is, an input terminal).

Figure 3:
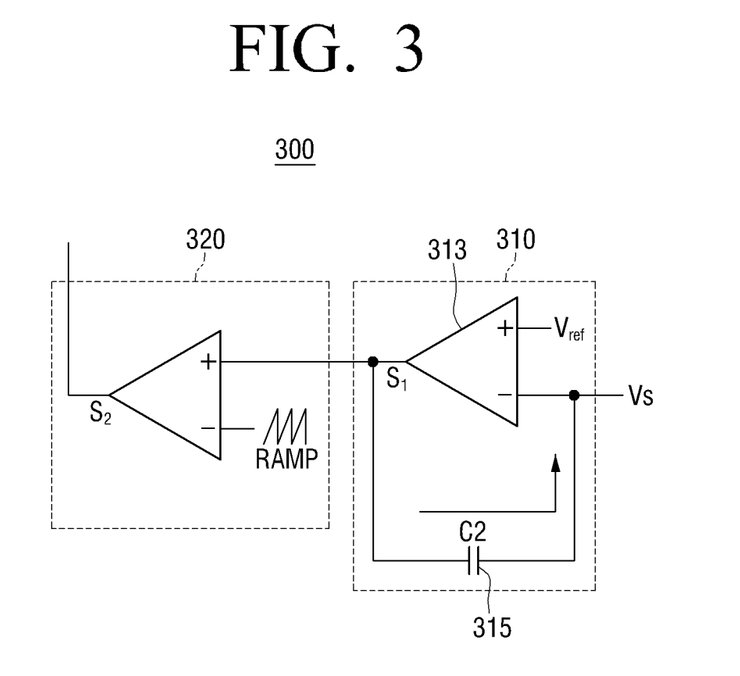
FIG. 3 is a view provided to explain the controller in FIG. 1 in detail.

FIG. 3 is a view provided to explain the controller 120 in FIG. 1 in detail. Referring to FIG. 3, the controller 300 includes a first comparator 310 and a second comparator 320. For convenience of explanation, unnecessary elements are not described in FIG. 3.

The first comparator 310 includes a first amplifier 313 and a capacitor 315.

The voltage output from the soft-start circuit unit 110, 200 may be applied to a negative terminal of the input terminal of the first amplifier 313. The reference voltage (Vref) may be applied to a positive terminal of the input terminal of the first amplifier 313. The first amplifier 313 compares the voltage of both terminals of the input terminal and outputs an error signal ($S_1$).

The second comparator 320 compares the error signal output from the first comparator 310 with the ramp signal of the negative terminal of the input terminal of the second comparator and outputs a control signal ($S_2$).

Figure 4A:
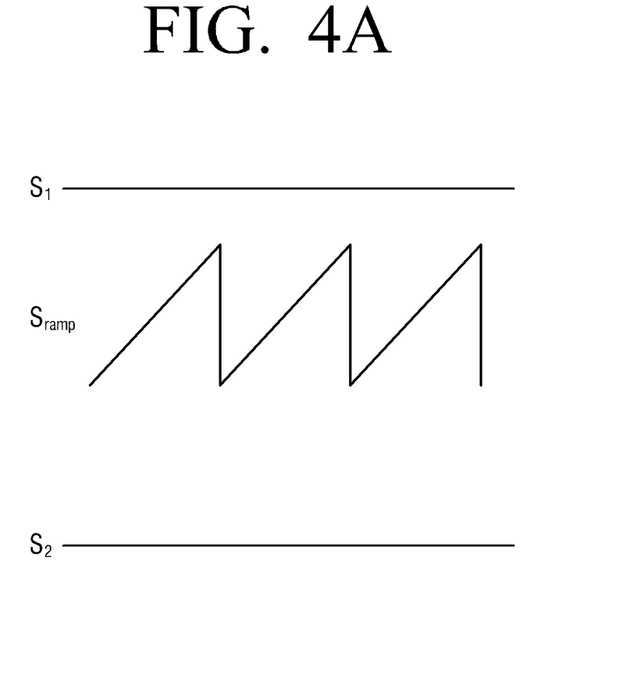
FIGS. 4A to 4C are views provided to explain the operation of the controller.
Figure 4B:
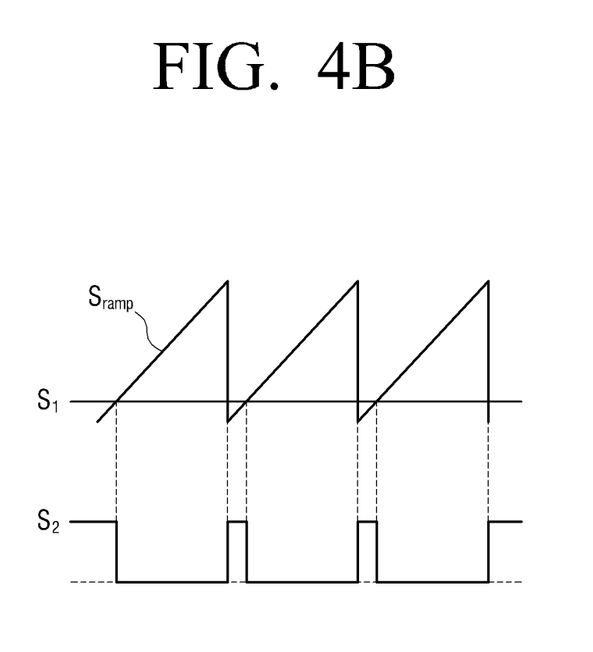
Figure 4C:
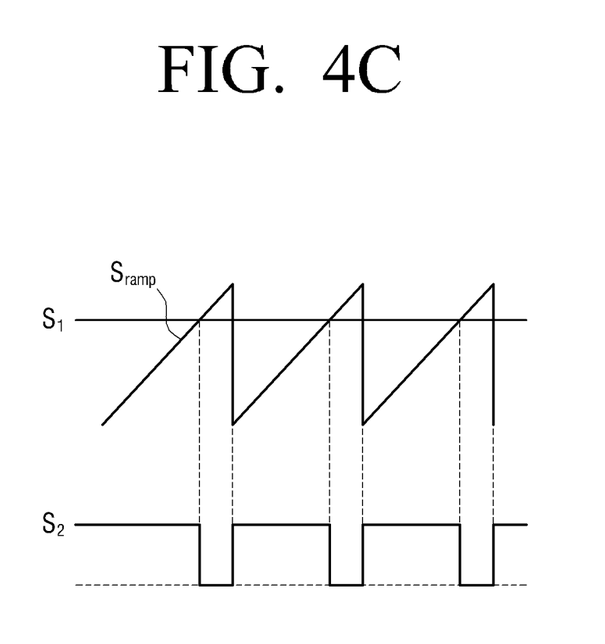
Figure 5A:
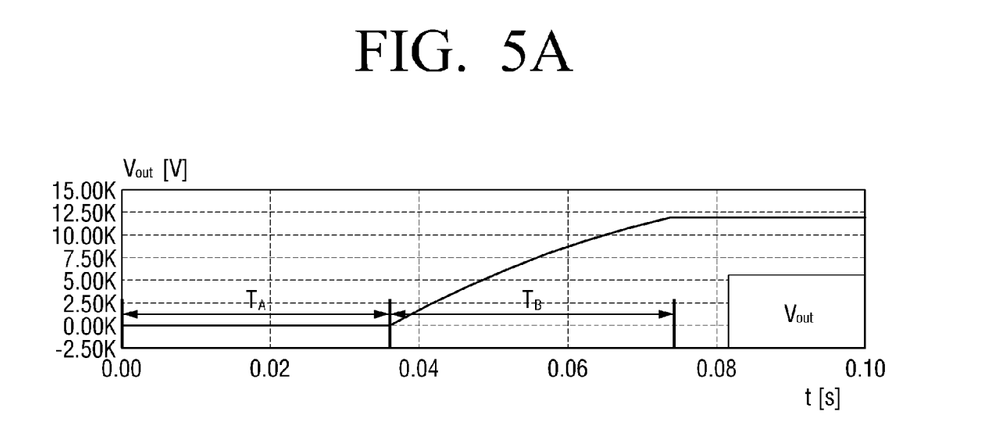
FIGS. 5A to 5C are views illustrating a voltage of each node of the present high voltage power supply.
Figure 5B:
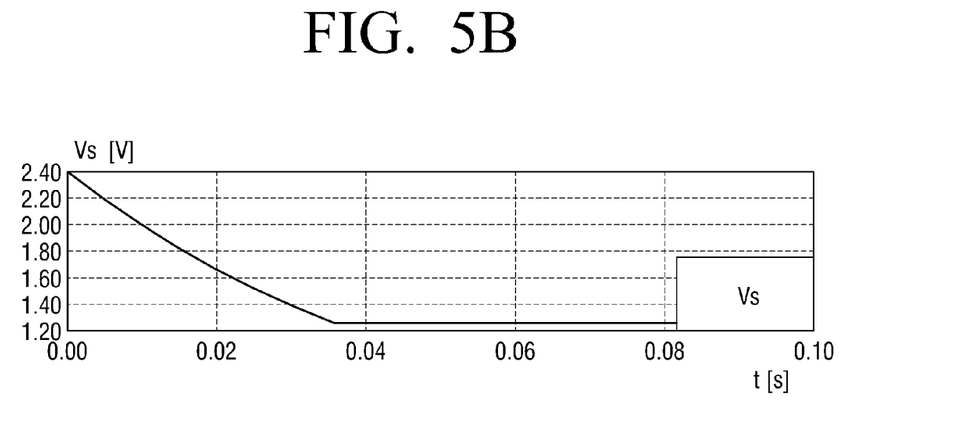
Figure 5C:
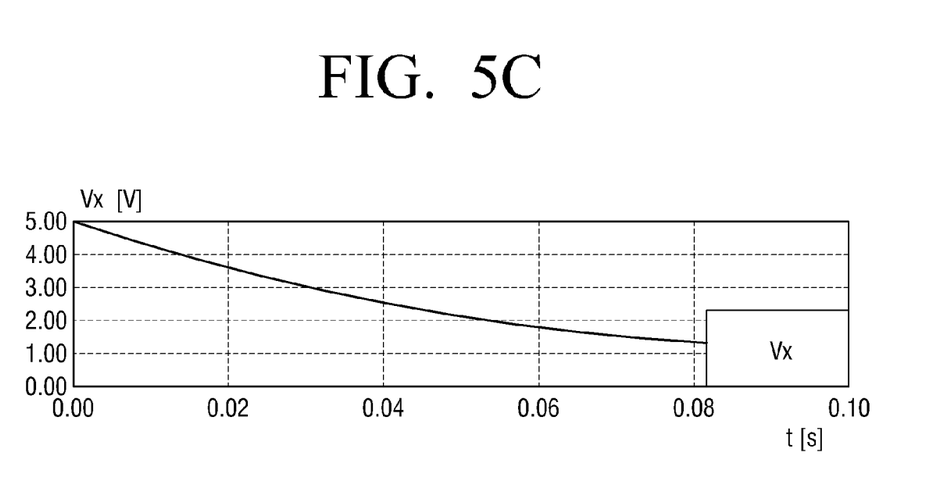

FIGS. 4A to 4C are views provided to explain the operation of the controller, and FIGS. 5A to 5C are views illustrating a voltage of each node of the present high voltage power supply. The operation of the present high voltage power supply according to an exemplary embodiment will be described in greater detail with reference to FIGS. 2 to 5C.

An enable signal such as the one illustrated in FIG. 2 may be applied to the base of the transistor (T) via the driving resistor (Rb). Accordingly, the driving voltage (Ve) of the collector of the transistor (T) may be applied to the node between the capacitor (Cd) of the charging and discharging unit 220 and the discharging resistor (Ra).

As such, if the driving voltage of the driving unit 210 is applied to the node between the capacitor (Cd) of the charging and discharging unit 220 and the discharging resistor (Ra), the driving voltage may be applied to the first node.

Initially, the driving voltage (Ve) is applied to the first node, but the voltage decreases exponentially as described with reference to FIG. 5. This may be summed up as the following Equation 1:

$$Vx = e^{-\frac{t}{Rd \cdot Cd}} Ve \qquad \text{[Equation 1]}$$

The second node voltage (Vs) may be inferred from the first node voltage. If the first resistor (Rs) is assumed to be identical to the third resistor (Rx) for convenience of explanation as illustrated in FIG. 5b, the second node voltage (Vs) may be ½ of the first node voltage (Vx).

Since the first node voltage (Vx) decreases exponentially as time elapses, the second node voltage (Vs) may also decrease exponentially as time elapses.

On the other hand, if KCL is applied to the second node, the output voltage (Vout) may be calculated as follows:

$$V_{out} = \frac{(Rg + Rs)}{Rs} Vref - \frac{Rg}{Rx}(Vx - Vref) \qquad \text{[Equation 2]}$$

Here, the first resistor (Rg) is higher than the second resistor (Rs) (Rg>>Rs). For convenience of explanation, the second resistor (Rs) is assumed to be identical to the third resistor (Rx), and the voltage of the diode is disregarded. If the first node voltage (Vx) calculated from the Equation 1 is applied to the Equation 2, the following Equation 3 may be obtained:

$$V_{out}(t) = \begin{cases} 0, & \text{if } 2Vref \le e^{-\frac{t}{Rd \cdot Cd}} Ve \\ \frac{Rg}{Rs}\left(2Vref - e^{-\frac{t}{Rd \cdot Cd}} Ve\right), & \text{if } 2Vref > e^{-\frac{t}{Rd \cdot Cd}} Ve \end{cases} \qquad \text{[Equation 3]}$$

If an enable signal is input to the soft-start circuit unit 110 for the first time (that is, t=0) and the driving voltage is 5V, the first node voltage (Vx) may be 5V and the second node voltage (Vs) may be 2.5V. If the reference voltage is 1.25V, the first amplifier 313 outputs the output signal ($S_1$) whose value is "0". If the second node voltage (Vs) decreases gradually as time elapses, the first amplifier 313 of the controller 300 outputs the output signal ($S_1$) whose value is "0" until the second node voltage (Vs) becomes 1.25V. In this case, the second node voltage (Vs) may be a natural voltage.

As a result, the control signal output from the controller 300 is also a signal whose value is "0", and the final voltage output from the converting unit 130 is also "0" as illustrated in FIG. 4A.

Accordingly, as illustrated in FIG. 5A, the delay time ($T_A$) may be calculated as Equation 4 using Equation 3 in the case where the final voltage is "0".

$$T_A = Rd \cdot Cd \cdot \ln\left(\frac{Ve}{2Vref}\right) \qquad \text{[Equation 4]}$$

On the other hand, there could be a case in which the second node voltage (Vs) should have a value lower than 1.25V as the first node voltage (Vx) decreases as time elapses. However, the second node voltage (Vs) may not decrease below the reference voltage (Vref), that is, 1.25V, by the first amplifier 313. Accordingly, as illustrated in FIG. 5B, the second node voltage (Vs) is fixed to the reference (Vref), 1.25V, after the delay time ($T_A$), and in this case, the voltage may be a forced voltage.

For example, if the first node voltage (Vx) is 2V, theoretically, the second node voltage (Vs) may be 1V, and thus electric current flows in the direction illustrated in FIG. 3 and eventually to the ground through the second resistor (Rs). Accordingly, the voltage of the output terminal of the first amplifier 313 increases. As a result, as illustrated in FIG. 4B, a control signal is output such that the signal output through the second comparator 320 has a predetermined duty ratio.

If the first node voltage (Vx) is 1V, lower than 2V, as time elapses, theoretically, the second node voltage may be 0.5V, and thus the voltage of the output terminal of the first amplifier 313 increases as illustrated in FIG. 4C. Accordingly, the duty ratio of the control signal in FIG. 4C becomes higher than the duty ratio of the control signal in FIG. 4B.

On the other hand, the time ($T_B$) from when the final voltage is output for the first time to when the final voltage is saturated may be calculated as Equation 6 below by applying Equation 5 which performs KCL in the second node to Equation 3 and assuming that the first resistor (Rg) is higher than the second resistor (Rs) (Rg>>Rs).

$$\frac{V_{ref}}{R_s} = \frac{V_{out}}{R_g} \quad \text{[Equation 5]}$$

$$T_B = Rd \cdot Cd \cdot \ln\left(\frac{2Vref}{Vref + Vdiode}\right) \quad \text{[Equation 6]}$$

Vdiode may be disregarded in Equation 6, and thus the time ($T_B$) from when the final voltage is output for the first time to when the final voltage is saturated may be adjusted by the value of the charging resistor (Rd) of the charging and discharging unit 220 and the capacitance of the capacitor (Cd).

Accordingly, even though the final voltage is not output in the time $T_A$ in FIG. 5A, the present high voltage power supply 100 may perform soft-start in the time $T_B$ in which the final voltage gradually increases as time elapses.

According to an exemplary embodiment of the present high voltage power supply 100, a slew rate is in inverse proportion to multiplication of the capacitance of the capacitor (Cd) and the charging resistor (Rd), and thus the slew rate may be easily controlled by changing the capacitor (Cd) and the charging resistor (Rd) value included in the soft-start circuit unit 200.

In addition, the present exemplary embodiment of the high voltage power supply 100 may easily control the time $T_A$ by changing the values of elements included in the soft-start circuit unit 200, the reference voltage (Vref), and the driving voltage (Ve). Moreover, the present exemplary embodiment of the high voltage power supply 100 may perform soft-start in high voltage while saving costs thanks to its relatively simple configuration.

Although a few exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A high voltage power supply, comprising:
   a soft-start circuit unit which outputs a natural voltage that decreases exponentially as time elapses and converts the natural voltage into a forced voltage having a predetermined scale if an enable signal is applied;
   a controller which compares the natural voltage output from the soft-start circuit unit with a reference voltage and outputs a control signal; and
   a converting unit which delays outputting a final voltage during a first predetermined time period and outputs the final voltage, which gradually increases as time elapses according to the control signal,
   wherein the controller outputs a control signal whose value is "0" if the natural voltage output from the soft-start circuit unit exceeds the reference voltage, and outputs a control signal whose duty ratio gradually increases as the natural voltage becomes lower than the reference voltage.

2. The high voltage power supply as claimed in claim 1, wherein the soft-start circuit unit, comprises:
   a driving unit which applies a driving voltage according to the enable signal;
   a charging and discharging unit which charges or discharges an energy storing element if the driving voltage is applied; and
   a voltage divider which outputs a distributed voltage according to the charging or discharging operation of the charging and discharging unit.

3. The high voltage power supply as claimed in claim 2, wherein the driving unit comprises:
   a transistor including a first terminal, a second terminal, and a third terminal; and
   a driving resistor connected in series to the first terminal of the transistor;
   wherein the enable signal is applied through the driving resistor to the first terminal of the transistor;
   wherein the driving voltage is applied to the second terminal of the transistor;
   wherein one node of the charging and discharging unit is connected to the third terminal of the transistor; and
   wherein the driving voltage is applied to the third terminal of the transistor according to the enable signal.

4. The high voltage power supply as claimed in claim 3, wherein the charging and discharging unit comprises:
   a capacitor;
   a charging resistor; and
   a discharging resistor;
   wherein a first end of the capacitor is connected to the third terminal of the transistor, and a second end of the capacitor is connected to a first node;
   wherein a first end of the charging resistor is connected to the first node, and a second end of the charging resistor is connected to a ground; and
   wherein a first end of the discharging resistor is connected to the first end of the capacitor, and a second end of the discharging resistor is connected to the ground.

5. The high voltage power supply as claimed in claim 4, wherein the voltage divider comprises:
   a first resistor;
   a second resistor;
   a third resistor; and
   a diode;
   wherein a first end of the first resistor is connected to a second node, and a second end of the first resistor is connected to an output terminal of the converting unit,
   wherein a first end of the second resistor is connected to the second node, and a second end of the second resistor is connected to the ground,
   wherein a cathode of the diode is connected to the second node, an anode of the diode is connected to a first end of the third resistor, and a second end of the third resistor is connected to the first node, and
   wherein the second node is connected to a first end of the controller.

6. The high voltage power supply as claimed in claim 5, wherein the diode prevents electric current flowing from the second node to the first node.

7. The high voltage power supply as claimed in claim 5, wherein a slew rate of the final voltage is in inverse proportion to a product of a capacitance of the capacitor and a resistance of the charging resistor.

8. The high voltage power supply as claimed in claim 5, wherein a voltage of the output terminal of the converting unit is calculated based on following equation:

$$V_{out}(t) = \begin{cases} 0, & \text{if } 2Vref \leq e^{-\frac{t}{Rd \cdot Cd}} Ve \\ \frac{Rg}{Rs}\left(2Vref - e^{-\frac{t}{Rd \cdot Cd}} Ve\right), & \text{if } 2Vref > e^{-\frac{t}{Rd \cdot Cd}} Ve \end{cases}$$

wherein Vout represents the voltage of the output terminal of the converting unit, Vref represents the reference voltage, Rd represents a resistance of the charging resistor, Cd represents a capacitance of the capacitor, Ve represents the driving voltage, Rg represents a resistance of the first resistor, Rs represents a resistance of the second resistor, and Rx represents a resistance of the third resistor.

9. The high voltage power supply as claimed in claim 5, wherein the first predetermined time period is calculated based on following equation:

$$T_A = Rd \cdot Cd \cdot \ln\left(\frac{Ve}{2Vref}\right)$$

wherein $T_A$ represents the first predetermined time period, Vref represents the reference voltage, Rd represents a resistance of the charging resistor, Cd represents a capacitance of the capacitor, and Ve represents the driving voltage.

10. The high voltage power supply as claimed in claim 5, wherein, following the first predetermined time period, the final voltage increases, during a second predetermined time period, from a first final voltage to a second final voltage.

11. The high voltage power supply as claimed in claim 10, wherein the second predetermined time period is calculated based on following equation:

$$T_B = Rd \cdot Cd \cdot \ln\left(\frac{2Vref}{Vref + Vdiode}\right)$$

wherein $T_B$ represents the second predetermined time period, Vref represents the reference voltage, Rd represents a resistance of the charging resistor, Cd represents a capacitance of the capacitor, and Vdiode represents a voltage of the diode.

12. A high voltage power supply, comprising:
a soft-start circuit unit which outputs a natural voltage;
a controller which compares the natural voltage output from the soft-start circuit unit with a reference voltage and outputs a control signal; and
a converting unit which delays outputting a final voltage during a first predetermined time period and outputs the final voltage, which gradually increases as time elapses according to the control signal,
wherein the natural voltage decreases exponentially as time elapses, and
wherein the controller outputs a control signal whose value is "0" if the natural voltage output from the soft-start circuit unit exceeds the reference voltage, and outputs a control signal whose duty ratio gradually increases as the natural voltage becomes lower than the reference voltage.

13. The high voltage power supply as claimed in claim 12, wherein the soft-start circuit unit converts the natural voltage into a forced voltage having a predetermined scale if an enable signal is applied.

14. The high voltage power supply as claimed in claim 12, wherein the soft-start circuit unit converts the natural voltage into a forced voltage having a predetermined scale if an enable signal is applied.

15. The high voltage power supply as claimed in claim 13, wherein the soft-start circuit unit, comprises:
a driving unit which applies a driving voltage according to the enable signal;
a charging and discharging unit which charges or discharges an energy storing element if the driving voltage is applied; and
a voltage divider which outputs a distributed voltage according to the charging or discharging operation of the charging and discharging unit.

16. The high voltage power supply as claimed in claim 15, wherein the driving unit comprises:
a transistor including a first terminal, a second terminal, and a third terminal; and
a driving resistor connected in series to the first terminal of the transistor;
wherein the enable signal is applied through the driving resistor to the first terminal of the transistor;
wherein the driving voltage is applied to the second terminal of the transistor;
wherein one node of the charging and discharging unit is connected to the third terminal of the transistor; and
wherein the driving voltage is applied to the third terminal of the transistor according to the enable signal.

17. The high voltage power supply as claimed in claim 16, wherein the charging and discharging unit comprises:
a capacitor;
a charging resistor; and
a discharging resistor;
wherein a first end of the capacitor is connected to the third terminal of the transistor, and a second end of the capacitor is connected to a first node;
wherein a first end of the charging resistor is connected to the first node, and a second end of the charging resistor is connected to a ground; and
wherein a first end of the discharging resistor is connected to the first end of the capacitor, and a second end of the discharging resistor is connected to the ground.

18. The high voltage power supply as claimed in claim 17, wherein the voltage divider comprises:
a first resistor;
a second resistor;
a third resistor; and
a diode;
wherein a first end of the first resistor is connected to a second node, and a second end of the first resistor is connected to an output terminal of the converting unit,
wherein a first end of the second resistor is connected to the second node, and a second end of the second resistor is connected to the ground,
wherein a cathode of the diode is connected to the second node, an anode of the diode is connected to a first end of the third resistor, and a second end of the third resistor is connected to the first node, and
wherein the second node is connected to a first end of the controller.

* * * * *